UNITED STATES PATENT OFFICE.

JOHN JAMES VARLEY, OF MERTON, COUNTY OF SURREY, ENGLAND.

PLASTIC COMPOSITION.

SPECIFICATION forming part of Letters Patent No. 321,543, dated July 7, 1885.

Application filed July 10, 1884. (Specimens.) Patented in England June 19, 1884, No. 9,305; in Germany June 28, 1884, No. 30,006; in France July 2, 1884, No. 163,102, and in Canada December 13, 1884, No. 20,726.

*To all whom it may concern:*

Be it known that I, JOHN JAMES VARLEY, a subject of the Queen of Great Britain, residing at Merton, in the county of Surrey, England, have invented new and useful Improvements in the Treatment of Certain Plastic Compositions, of which the following is a specification.

This invention relates to the treatment of that class of compositions which contain resins, gums, lacs, tars, or pitches, and which compositions are mixed or manufactured under heat, or by solvents, and are of a plastic nature—that is to say, those compositions of a kindred nature to that known as "lionite," and which are used for molding various articles of utility and ornament.

It is well known that articles made from compositions such as those above named are defective in that they one and all are subject more or less to be acted on by heat—that is to say, by such heat as is derived from the sun, from exposure of the goods in shop-fronts, or even from warm rooms—whereby the goods become soft and warped and bent, and in many cases they are rendered entirely useless when brought in contact with such heat as above named, and thus the marketable value of all such goods is greatly reduced.

The object of this invention is to obviate the defect in the articles made of plastic compositions such as are above mentioned, owing to their liability to become warped or altered in shape under the action of heat. This object is effected by so heating articles made from such compositions that they shall be rendered practically proof against and not liable to be injured or put out of shape by the action of heat, as above described. This is effected by subjecting them, as hereinafter described, to the action of heat sufficient to harden, and in a measure to bake them, without rendering them brittle or liable to be cracked. The plastic compositions may be molded while in a plastic state, and are afterward converted by the application of heat into a non-plastic substance of a stiff and solid character. This treatment renders goods made from the cheap plastic materials hereinafter mentioned equal in many respects to those made from that material known as "vulcanite," which is of far greater cost. Compositions which are partly composed of resins, gums, tars, and pitches, and gums of a resinous nature, are for the most part mixed under heat, the heat being applied in order to soften the resins, gums, and the like. Other substances are then added, either of a fibrous or non-fibrous nature, the whole being mixed together, and thus a composition is obtained, as is well known, which, when heated, is of a plastic nature and can be molded into articles of any desired shape. It is to these articles that this invention has reference.

For the purposes of my invention I find it advantageous to employ a chamber suitable in size and shape to the requirements of the articles to be treated, and apply heat in any ordinary way to such heating-chamber.

Suitable plastic compositions may, as is well known, be made of various substances in various proportions. For instance, a suitable composition may be made by combining about eight pounds of shellac, four pounds of rosin, sixteen pounds of fiber, two pounds of tar, and one pound of lamp-black; but these proportions may, as is obvious, be varied, according to the object sought to be attained; also, other gums and substances may be used to produce a plastic composition that may be converted and hardened by heat according to my invention. The heating-chamber should be provided with shelves or frames, which should be supported and divided one from the other, so that the articles to be treated may be placed therein, so as to be conveniently heated but not being liable to be damaged. After molding or otherwise shaping the articles in the plastic composition, I place them in the heating-chamber. I then, by means of a suitable arrangement, such as a blast-pipe connected with the chamber, blow in a current of hot air over and about the articles or goods to be treated. This operation is continued until the articles or goods have undergone a change and have become hard and of so tough a nature that they will no longer soften under the effect of the degree of heat to which such goods are likely to be exposed.

I sometimes provide the chamber constructed to contain the goods to be treated with steam-pipes for raising the temperature up to about 150° to 300° Fahrenheit, according to the nature of the composition. The heat should be applied gradually and not raised too high, so as to risk injuring the articles by causing them to crack. The articles are placed supported or suspended, as the nature of the goods may require, in the chamber and allowed to remain under the action of the heat until they have become toughened or hardened or changed in character in the manner described.

It is obvious that other suitable means of heating the chamber can be employed.

It may not always be found necessary to support or suspend the goods to be treated according to my invention, as some classes of goods are of such shape that they may be so placed as not to become damaged in any way. In such cases the goods may be placed on racks or frames or the like, but in most cases it is found advantageous to support them in some way until they become hard enough to retain their shape; or they may be placed in molds.

The articles so treated will, when the heat is properly applied for a sufficient time, be found to be changed or converted in character. Instead of being comparatively soft and yielding to the action of heat, they will be found to be tough, hard, and heat-resisting.

Having now particularly described and ascertained the nature of my said invention, and in what manner the same is to be performed, I declare that what I claim is—

1. Treating articles or goods made from plastic compositions, such as above named, by subjecting them to heat and so changing them in character and quality, as and for the purpose hereinbefore described.

2. The manufacture of articles of a tough, hard, and heat-resisting character, by subjecting them, when made of plastic composition, such as are above mentioned, and while in a comparatively plastic state, to the action of heat, substantially in the manner described.

J. J. VARLEY.

Witnesses:
  A. ALBUTT,
  B. BRADY.